United States Patent [19]

Parker

[11] 4,019,104
[45] Apr. 19, 1977

[54] VARIABLE SPEED INDUCTION MOTOR

[76] Inventor: Louis W. Parker, 2408 Sunrise Key Highway, Fort Lauderdale, Fla. 33304

[22] Filed: May 12, 1975
[21] Appl. No.: 576,934

Related U.S. Application Data

[63] Continuation-in-part of Ser. No. 454,991, March 26, 1974, abandoned.

[52] U.S. Cl. ............................. 318/195; 310/113; 318/197; 318/237
[51] Int. Cl.² ...................... H02P 7/36; H02K 17/24
[58] Field of Search ........... 310/113; 318/195, 196, 318/197, 237, 49, 214

[56] References Cited

UNITED STATES PATENTS

| | | | |
|---|---|---|---|
| 2,236,984 | 4/1941 | Alexanderson | 318/237 X |
| 2,703,862 | 3/1955 | Gordon | 310/113 X |
| 3,290,574 | 12/1966 | Roe | 318/214 |
| 3,549,968 | 12/1970 | Shibata | 318/197 |

Primary Examiner—Robert J. Hickey
Attorney, Agent, or Firm—Pollock, VandeSande & Priddy

[57] ABSTRACT

A polyphase motor of the wound rotor type has the rotor of a polyphase generator, smaller in size than said motor, mounted on the motor shaft. Polyphase voltages produced across the generator rotor are coupled to the input of an amplifier having an output power commensurate with the size of the motor and the amplifier output is connected to the windings of the motor rotor to supply the current to the motor rotor windings. The frequency of the voltage fed to the motor rotor is inversely proportional to the motor speed, and a frequency sensitive filter is provided to adjust the output of the amplifier thereby to control the motor speed and to maintain said speed at a selected predetermined value regardless of the motor load.

22 Claims, 4 Drawing Figures

VARIABLE SPEED INDUCTION MOTOR

CROSS REFERENCE TO RELATED APPLICATION

This application is a continuation-in-part of my prior copending application Ser. No. 454,991, filed Mar. 26, 1974, for "Induction Motor Controller", now abandoned.

BACKGROUND OF THE INVENTION

The present invention is concerned with an improved electric motor system employing motors of the wound rotor type, and is more particularly concerned with a variable speed motor system which is adapted to enable a polyphase motor to start without excessive current, which is further adapted to increase the available power output and/or torque of the motor, and which is operative to regulate the motor speed so as to maintain the speed at a selected fixed value regardless of the load on the motor.

As is well known, polyphase motors of the induction type characteristically include a stator winding which is energized by a polyphase power source operative to produce a rotating magnetic field adjacent the motor rotor, which field is in turn operative to induce voltages in the rotor to generate current in the rotor windings which causes the rotor to follow the rotating field. The current flow generated in the rotor when the rotor is still at rest is very large and, as the rotor gains speed, the difference between its speed and that of the rotating field decreases so that the current in the rotor correspondingly decreases in magnitude. The main reason for the high current at start is that the stator magnetic field cannot penetrate the rotor due to the opposing magnetic field generated by the high current induced in the low resistance winding on the rotor. Moreover the starting current lags the voltage by a large phase angle. For this reason, when the rotor is of the wound type, it is customary to connect the rotor windings to slip rings which are in turn connected to a starter comprising a plurality of variable resistors which are connected in series with the rotor windings respectively to provide appropriate starting conditions and, when the motor has attained its normal working speed, the resistors forming the starter are disconnected and the slip rings are short-circuited so that the rotor will then function essentially as a squirrel-cage rotor during normal operation.

Since the current in the rotor winding of a conventional induction motor is generated by transformer action from the stator, the motor stator is burdened not only by the need to generate its own magnetic field and the need to supply power overcoming its own losses, but it must also generate sufficient current in the rotor to create the magnetic field of the rotor and to supply the rotor losses as well. Under starting conditions, moreover, the motor stator must supply the power which is dissipated in the variable resistors which constitute the conventional starter arrangement. These characteristics of conventional polyphase induction motors of the wound rotor type have required that comparatively high levels of current flow be effected in the stator coils, but have nevertheless provided a practical limit on the power level which can be supplied to the motor rotor and, in addition, have limited the available power output and torque of the motor.

The present invention is intended to overcome these and other problems of the prior art.

SUMMARY OF THE INVENTION

In accordance with the present invention, a motor system is provided wherein power is supplied to the rotor of a polyphase electric motor from an independent source, as contrasted to conventional systems where the rotor current is obtained by transformer action from the motor stator, thereby reducing the level of current which must flow in the motor stator coils, eliminating the losses caused by the usual starting or regulating resistors, supplying more power to the motor rotor than has been possible by the conventional methods employed heretofore, and increasing the available power output and torque of the motor. More particularly, the system of the present invention consists of three main components, i.e., a polyphase induction type motor having a wound rotor, a smaller polyphase induction motor (which will be called a generator) also of the wound rotor type having the generator rotor mechanically connected to the motor voltages shaft for rotation with the motor rotor, and a polyphase amplifier which amplifies the energy produced by the generator rotor and which supplies the amplified energy to the motor rotor windings.

Except for their comparative sizes, the motor and generator stators are electrically similar, have the same number of poles, and operate on the same voltages and phases. The stators of the motor and generator are energized in parallel from the same polyphase power source so that the output voltages from the generator rotor have the same frequency as the voltage which are induced in the motor rotor by the rotating field of the motor stator. The amplifier employed is linear and its output polarity is so chosen that the amplified sine-wave-shaped generator output voltage will generate a rotating magnetic field in the rotor of the motor that adds to the rotating magnetic field of the stator. Under starting conditions if the windings of the motor stator and generator stator are in alignment with one another and their magnetic fields add, there will only be a wattless current flow in both the stator and rotor windings of the motor.

Since no torque would be generated by the motor under these conditions, the generator stator is so mounted that it may be rotated manually through an angle about the motor shaft to selectively produce an angular displacement between the windings of the motor stator and generator stator, thereby to produce a phase difference between the amplifier output voltage and the stator voltage to achieve a controllable torque between the motor stator and motor rotor without need for the usual starter arrangement. Preferably the phase of the rotor should lag behind the stator so that the rotating stator magnetic poles will drag behind them the rotor poles.

One embodiment of the present invention in addition to providing the above structural features and advantages, incorporates additional circuits and components which permit the speed of the motor to be accurately regulated, and to be maintained at fixed values regardless of load, at various speed settings up to and including synchronous speed. This highly desirable result is based upon a recognition that, in a system of the type described above, the frequency of the voltage which is fed to the induction motor rotor is inversely proportional to the speed of the motor, i.e., the frequency is highest under motor starting conditions and decreases to nearly zero when the motor and its associated generator are at full speed. In accordance with this embodiment of the present invention, therefore, a frequency sensitive filter arrangement is provided to adjust the output of the amplifier which feeds power from the generator rotor to the motor rotor so that, when the frequency being supplied to the amplifier is below a predetermined value, the amplifier output is reduced to a level which prevents further acceleration of the motor.

The frequency sensitive filter preferably includes a plurality of sections, having different cut-off points respectively, which can be manually selected by an operator of the equipment thereby to permit motor speed to be regulated relative to any one of a plurality of discrete values, and the system preferably also includes a circuit for selectively permitting the motor speed to be varied or controlled continuously, e.g., by means of a hand-operated potentiometer. The frequency sensitive filter can take the form of a high pass filter in certain applications of the invention, but in other applications of the invention e.g., when the motor system is being used in an arrangement wherein a heavy weight is being lowered and it is desired to limit the speed of the descending object, the filter may be of the low pass type.

To increase the power capabilities of the system, the amplifier may be of the plural stage type, comprising a first stage the input of which is derived from the generator rotor, with said first stage feeding a second stage the output of which supplies power to the motor rotor. The second stage may be a transistor type or it can take the form of two or more small DC generators which are rotated at constant speed by a separate induction motor with the AC output of the first amplifier stage being supplied to the field coils of the said DC generators. Comparatively high levels of power can be supplied to the motor rotor by such an arrangement.

The system of the present invention has the major advantage that motor control is accomplished at very low power levels, whereby only small comparatively inexpensive components are required. A large motor can easily be controlled from a remote location by connecting the remote motor controller to the motor operating location by means of low power wiring.

BRIEF DESCRIPTION OF THE DRAWINGS

The foregoing objects, advantages, construction and operation of the present invention will become more readily apparent from the following description and accompanying drawings in which.

DESCRIPTION OF THE PREFERRED EMBODIMENTS

Figure 1:
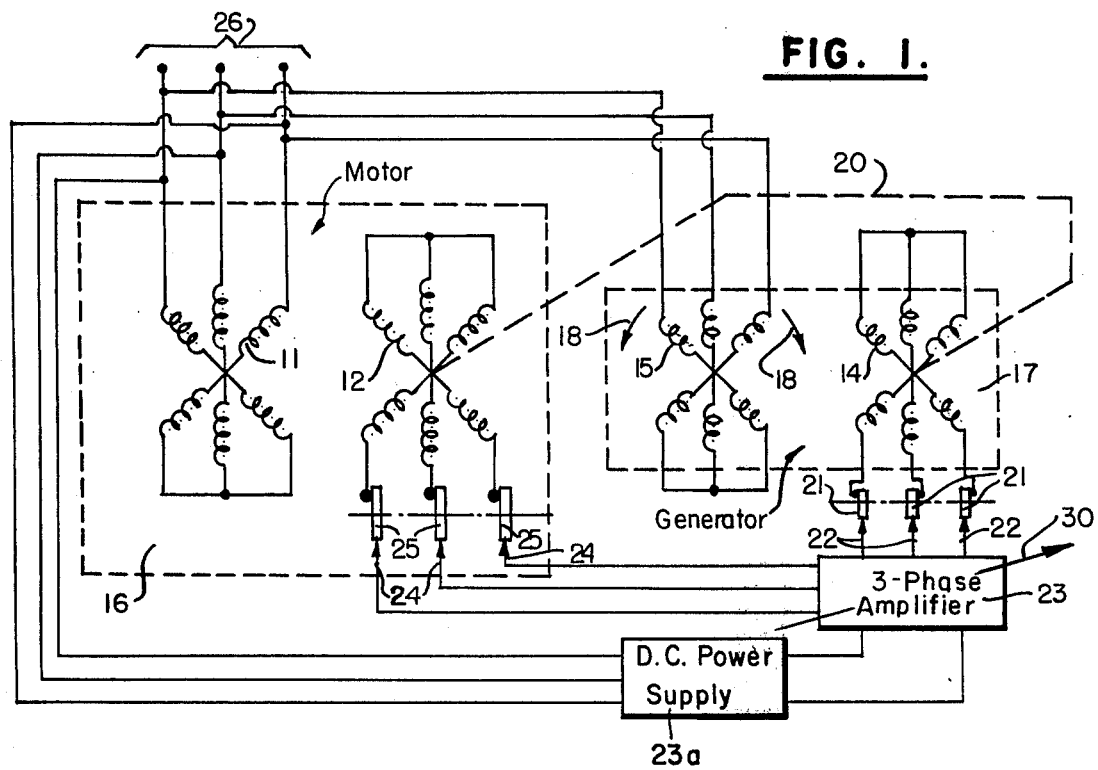
FIG. 1 is a schematic diagram of an electric motor system constructed in accordance with the present invention.
Figure 2:
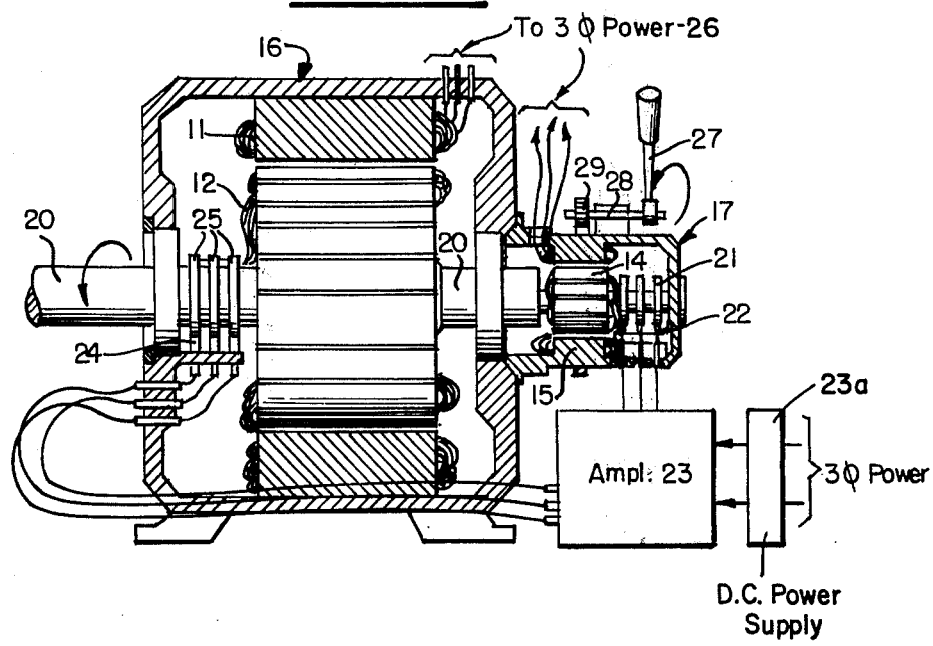
FIG. 2 is a cross-sectional view of an electric motor system constructed in accordance with the schematic of FIG. 1.

FIGS. 1 and 2, like elements of which have been identified by like numerals, depict a controller arrangement comprising two AC polyphase machines of the wound-rotor type, one of which is significantly larger than the other, with the rotors of the two machines being mounted for rotation together on the same shaft, with the wound stators of the machines being energized in parallel from the same polyphase power source and being mounted for angular displacement relative to one another about said shaft, and with voltages generated across the rotor of the smaller machine being supplied as inputs to a polyphase amplifier the outputs of which are connected respectively to the rotor windings of the larger machine. The larger machine has been designated 16 and is referred to hereinafter as the polyphase "motor". The smaller machine, designated 17, will be referred to hereinafter as the polyphase "generator".

Motor 16 comprises a wound stator 11 which, in the form shown in FIG. 1, consists of six coils, two for each phase, with these two coils being diametrically opposed to one another on the stator in conventional fashion. Motor 16 further comprises a wound rotor 12 having a plurality of coils which are the electrical duplicate of the stator coils 11. The overall arrangement of motor 16, as shown in FIG. 1, constitutes a two-pole, three-phase, electric motor of the wound rotor type. A two-pole motor has been chosen for simplicity, but it should be understood that multiple pole motors are also applicable to the present invention.

Smaller machine 17, i.e., the generator, is electrically similar to motor 16, has the same number of poles, operates on the same voltages and phases, and comprises a wound stator 15 associated with a wound rotor 14. Generator rotor 14 is mounted, in common with motor rotor 12, on the motor shaft 20. The two stators 15 and 11 are axially spaced from one another along said shaft 20, and are disposed about said shaft closely adjacent to their respective rotors 14 and 12. Generator stator 15 is, moreover, adapted to be angularly displaced about shaft 20 as indicated by the arrows 18 in FIG. 1, thereby to permit the coil winding of the two stators 11 and 15 to be disposed in alignment with one another or to be angularly displaced from one another for the purposes to be discussed hereinafter. For purposes of size comparison, motor 16 may be a 100-horsepower machine, whereas generator 17 would have a rating in the order of one horsepower or less.

The several windings comprising generator rotor 14 are connected to slip rings 21 respectively, with said slip rings 21 in turn being connected via brushes 22 to the inputs of a linear, three-phase amplifier 23. The sinewave-shaped outputs of said amplifier 23 are in turn connected to further brushes 24 which engage slip rings 25 connected respectively to the windings of motor rotor 12. The amplifier 23 may be transistorized or of some other type, is capable of amplifying three-phase sinewave-shaped voltages from DC to about 100 hz, and has an output power of several kilowatts commensurate with the size of motor 16. DC power to operate this amplifier is obtained in conventional manner by connecting power source 26 to the amplifier through a three-phase rectifier power supply 23a. The purpose of the linear amplifier 23 is to amplify the three-phase output of generator 17, appearing across the windings of generator rotor 14, and to supply the amplified power to the windings of motor rotor 12. The gain of amplifier 23 is adjusted by control 30 to a suitable level.

The windings of motor stator 11 and generator stator 15 are connected to a common three-phase power source 26 which energizes the two stators with the same voltages and in phase with one another. Since the two stators 11 and 15 are each fed from the same power supply and have the same number of poles, stators 11 and 15 will produce rotating magnetic fields having the same speeds of rotation adjacent their respective rotors 12 and 14. Moreover, since generator rotor 14 is electrically similar to motor rotor 12, the rotating field produced adjacent rotor 14 will induce three-phase voltages in the generator rotor 14 which will have the same frequency and phase as the three-phase voltages induced in motor rotor 12 by the rotating field produced by stator 11. It is necessary, however, that the voltages induced across the generator rotor 14 be of the same magnitude as the voltages induced across the windings of motor rotor 12 since the voltages appearing across the windings of generator rotor 14 are fed to amplifier 23 which can be designed to operate from any of a wide range of voltages. In practice, the voltages induced across the windings of generator rotor 14 will be substantially smaller than the voltages which are induced in the windings of motor rotor 12 when said rotors are stationary, and the gain of amplifier 23 is chosen to produce sinewave-shaped output voltages which are applied to the windings of motor rotor 12 via brushes 24 and slip rings 25, the amplifier output voltages being substantially equal to the voltages that are induced across the windings of motor rotor 12 under stationary rotor conditions. To assure this condition, manual control 30 regulates the gain of amplifier 23.

Considering the operation of the arrangement shown in FIGS. 1 and 2, let us initially assume that motor stator 11 and generator stator 15 are energized from source 26, that the windings of the two stators are in alignment with one another, and that shaft 20 is stationary, i.e., the two rotors 12 and 14 are not rotating. Under these conditions, the generator output voltages applied to the inputs of amplifier 23 will have the same frequency as the three phase voltages which are applied to the motor stator. When the output of amplifier 23 is applied to motor rotor 12 it creates a similar rotating field in the motor rotor as is in the motor stator. These two fields rotate together in the same direction and in phase with one another and their magnetic polarity is additive. In other words, opposite to a north pole on the stator there is a south pole on the rotor and these poles rotate together.

Under this condition, there is no torque generated by the motor rotor, only a radial attraction between opposing poles of the stator and rotor. The currents in both rotor and stator are low and consist mainly of a wattless component.

As explained previously, the generator stator 15 is so mounted physically that it may be rotated over an angle about the center line of the machine as indicated in FIG. 1 by arrows 18. As depicted in FIG. 2, this angular displacement of generator stator 15 can be effected manually by a control handle 27 which is coupled via shaft 28 to gears 29 which engage the housing of generator 17 upon which the stator 15 is supported. If, under the circumstances described previously, generator stator 15 is moved through an angle so as to be out of alignment with motor stator 11, the generator voltages applied to the input of amplifier 23, and therefore the amplified voltages appearing at the output of said amplifier 23, will be shifted in phase relative to the stator voltage, i.e., there will now be a phase difference between the voltages which are supplied to slip rings 24 from the output of amplifier 23 and the voltages which are supplied to the motor stator. The phase difference in the voltages supplied to slip rings 25 which results in moving the rotating magnetic poles on the rotor a few degrees behind the rotating poles on the stator gives rise to a torque in motor 16. This causes shaft 20, and therefore rotors 12 and 14, to commence rotating without need for the usual starter arrangement.

Once the machine has reached its operating speed, it will operate in a manner similar to a synchronous motor but at varying speed. In so operating, the machine will have a higher torque than a conventional induction motor since the field of the motor rotor can be made quite high (and since the torque is proportional to the product of the stator and rotor fields). The high torque is attainable at any speed, including zero speed.

In the arrangement shown in FIGS. 1 and 2, the frequency of the voltage generated across the generator rotor 14, and at the output of amplifier 23 for supply to motor rotor 12, is inversely proportional to the speed of the motor, i.e., the frequency is at its highest value under motor starting conditions and decreases to nearly zero (or DC) under full speed conditions. This operating characteristic of my invention is used, in the modification shown in FIG. 3, to provide a comparatively simple but highly reliable mechanism for accurately regulating or controlling the motor speed and/or torque. More particularly, the embodiment of FIG. 3 includes provision for monitoring the frequency of the voltage which is supplied by the generator rotor to the amplified and uses the monitored parameter to control the amplifier gain. A frequency sensitive filter adjusts the output of the amplifier so that, below a predetermined frequency corresponding to the desired speed of motor rotation, the amplifier output is reduced to a point wherein the motor is unable to accelerate further. The filter is so arranged that its cutoff point can be manually adjusted, e.g., in discrete steps, to permit any one of a plurality of possible motor speeds to be selected for regulation of the system.

Figure 3:
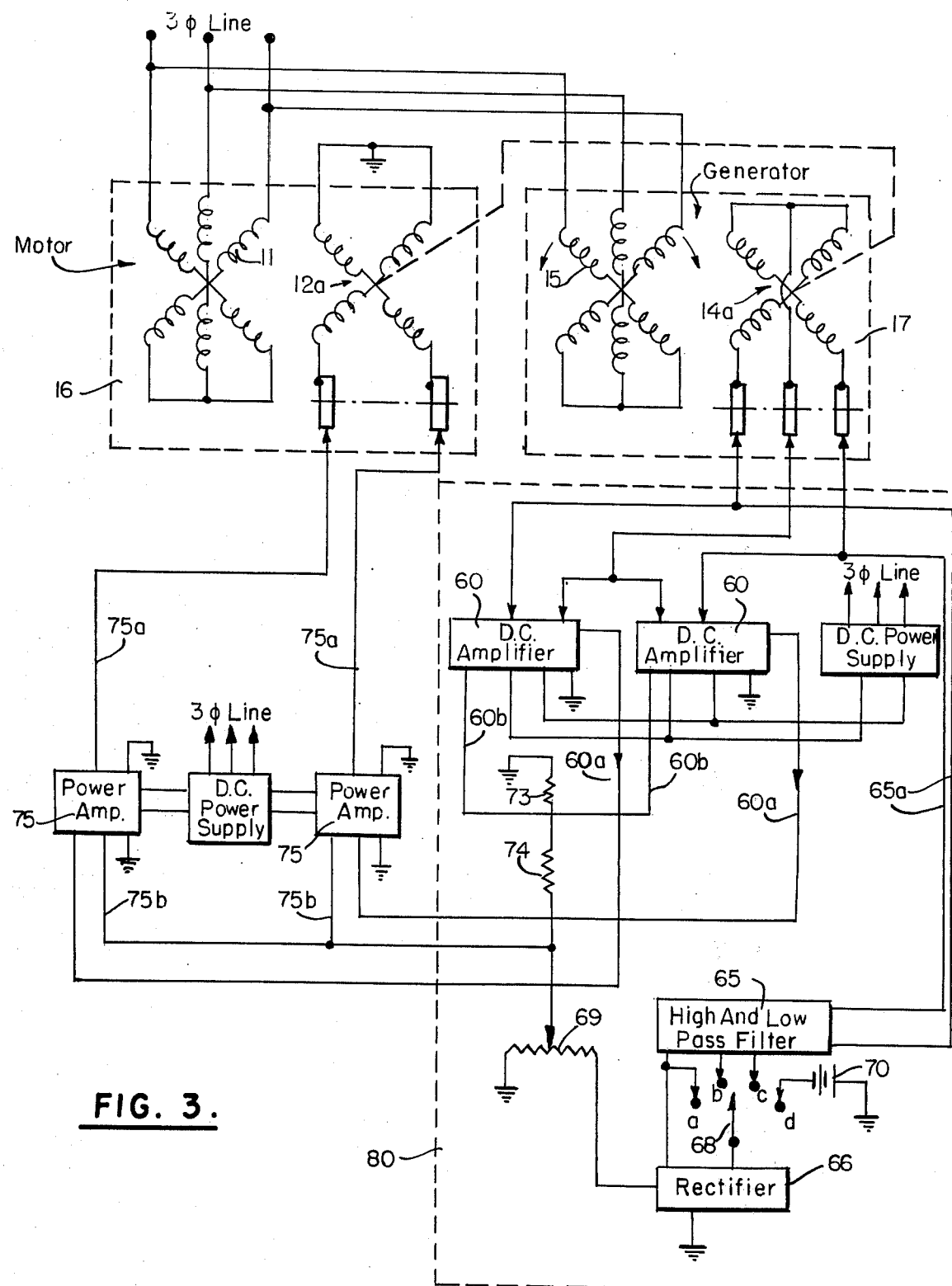
FIG. 3 is a schematic diagram of a modified form of the present invention incorporating circuits for use in controlling the speed and/or torque of the motor.

The variable speed motor system shown in FIG. 3 is similar to the arrangement previously described with respect to FIG. 1, except that rotor 12a of motor 16 and rotor 14a of generator 17 are each wound for two phase operation instead of three phase operation. In this respect, two phase and three phase windings work equally well. In contrast to the arrangement of FIG. 1, the amplifier which derives its input from the generator rotor and supplies power to the motor rotor is automatically controlled during the operation of the system, e.g., by an automatic control of the amplifier gain, to control the power which is actually supplied to motor rotor 12a thereby to control the rotational speed and/or torque of the motor 16.

The amplifier arrangement shown in FIG. 3 comprises two stages of amplification for each phase. The first stage includes a pair of DC amplifiers 60 whose inputs are connected respectively to the two different phase windings of generator rotor 14a to supply amplified sinewave outputs on lines 60a. The outputs of amplifiers 60 are applied to power amplifiers 75 and thence to the rotor 12a of motor 16. The gains of the first stage amplifiers 60, each of which may comprise a comparatively low power transistorized amplifier, can be varied by controlling the voltage present on bias control lines 60b. The voltage on each line 60b is in turn controlled by a high pass (or low pass) filter 65 whose input is connected via lines 65a, to the output of generator rotor 14a, and whose output is connected through a rectifier 66 and a continuously variable potentiometer 69 to the aforementioned bias control lines 60b. The gain control voltage on lines 60b is attenuated by resistors 73 and 74, but its full value is used to control power amplifiers 75 via lines 75b.

High pass filter 65, which monitors the voltage frequency of the output of generator rotor 14a to control the gain of amplifiers 60 and 75, may contain several independent sections which are respectively designed to cut off at different frequencies, e.g., one section may cut off at 30 cps, another at 15 cps, etc. The outputs of these different sections are indicated in FIG. 3 by two contacts b and c (although additional such sections may obviously be provided) which are adapted to be connected as inputs to rectifier 66 under the control of a manually operable switch 68. The switching arrangement may also include a switch point a which, when engaged by switch 68, operates to completely disable the control provided by filter 65, and a switch point d which, when engaged by switch 68, operates to connect a DC source 70 to rectifier 66 to supply DC to the bias control lines 60b of the amplifiers 60, for the reasons discussed hereinafter.

When the motor 16 and its associated generator 17 run at half synchronous speed, rotor 14a of the generator will generate a voltage at 30 cycles per second. If it is desired to have the motor run at this speed, switch 68 is moved to the appropriate switch contact corresponding to a filter section having a cut off of 30 cycles. The filter will accordingly just pass that frequency, and the filter output signal is then applied to rectifier 66 to produce a rectified output which is used to control the gain of amplifiers 60 and 75. Amplifiers 60 and 75 operate at nearly full gain at the particular bias obtained, under these conditions, from rectifier 66. If the motor should tend to increase in speed, however, the output frequency from generator rotor 14a will drop below 30 cycles and the output from rectifier 66 will also drop and cause a reduction in the gain of amplifiers 60 and 75. Depending upon the sharpness of cutoff of filter 65, even a comparatively slight increase in speed may completely cut off the power supply to rotor 12a of motor 16 making an increase in speed above the set value impossible.

Similar regulated operation may be obtained at other selected speeds by appropriate manipulation of switch 68, to cause the motor to run at any desired speed, regardless of load, up to and including synchronous speed. When switch 68 is moved beyond the lowest cutoff point section of the high pass filter 65 (which lowest pass section may consist only of a large capacitor), the switch 68 engages switch point d to apply DC to amplifiers 60, resulting in direct current in the DC amplifier output on lines 60a and 75a. The DC potential thus applied to the motor rotor will pull motor 16 and its associated generator 17 into synchronous operation.

The speed of motor 16 may also be varied continuously by manipulation of potentiometer 69. When using this manual control, high pass filter 65 can be completely disabled by moving switch 68 into engagement with switch point a.

The variable speed electric motor system shown in FIG. 3 may be used in a variety of applications. One such use is in conjunction with derricks intended to lift and/or lower heavy weights. In an application of this type the motor speed and torque must be adjusted during a lifting operation, and speed and torque must also be adjusted during a lowering operation when the descending weight adds to the motor torque. Under this latter operating condition, the system can be caused to exert a counter torque in either of two ways. One technique was described earlier in reference to FIGS. 1 and 2, i.e., the stator 15 of induction generator 17 can be angularly displaced to supply the desired counter torque. An alternative technique is to reverse the rotation of motor 16 by transposing two of the power input connections thereto by means of an appropriate switching arrangement (not shown), while lowering the motor torque, by use of speed control 69, to the point where the motor torque drops below the torque created by the descending weight.

If it is desired to limit the speed of the descending object, this may also be done by a procedure entirely similar to that described above except that the filter 65 should be of the low pass rather than of high pass type, the operation of the resulting system otherwise being the same as that already described. To accommodate these various different conditions of operation, filter 65 may constitute a high pass filter and a separate low pass filter each or both of which may have the plural filter sections already described, and a further switching arrangement may be provided to select either the high pass or low pass filter for use in controlling amplifiers 60 and 75 in dependence upon whether the derrick is being employed to lift or lower a weight.

The control operations accomplished by the arrangement illustrated in FIG. 3 are all effected at very low power levels. As a result, the control circuit requires only small, comparatively inexpensive components. A large motor can easily be controlled from a remote location which is connected to the motor operating location by means of lower power wiring. These low power components which may be located remotely are surrounded on FIG. 3 by dotted line 80.

Figure 4:
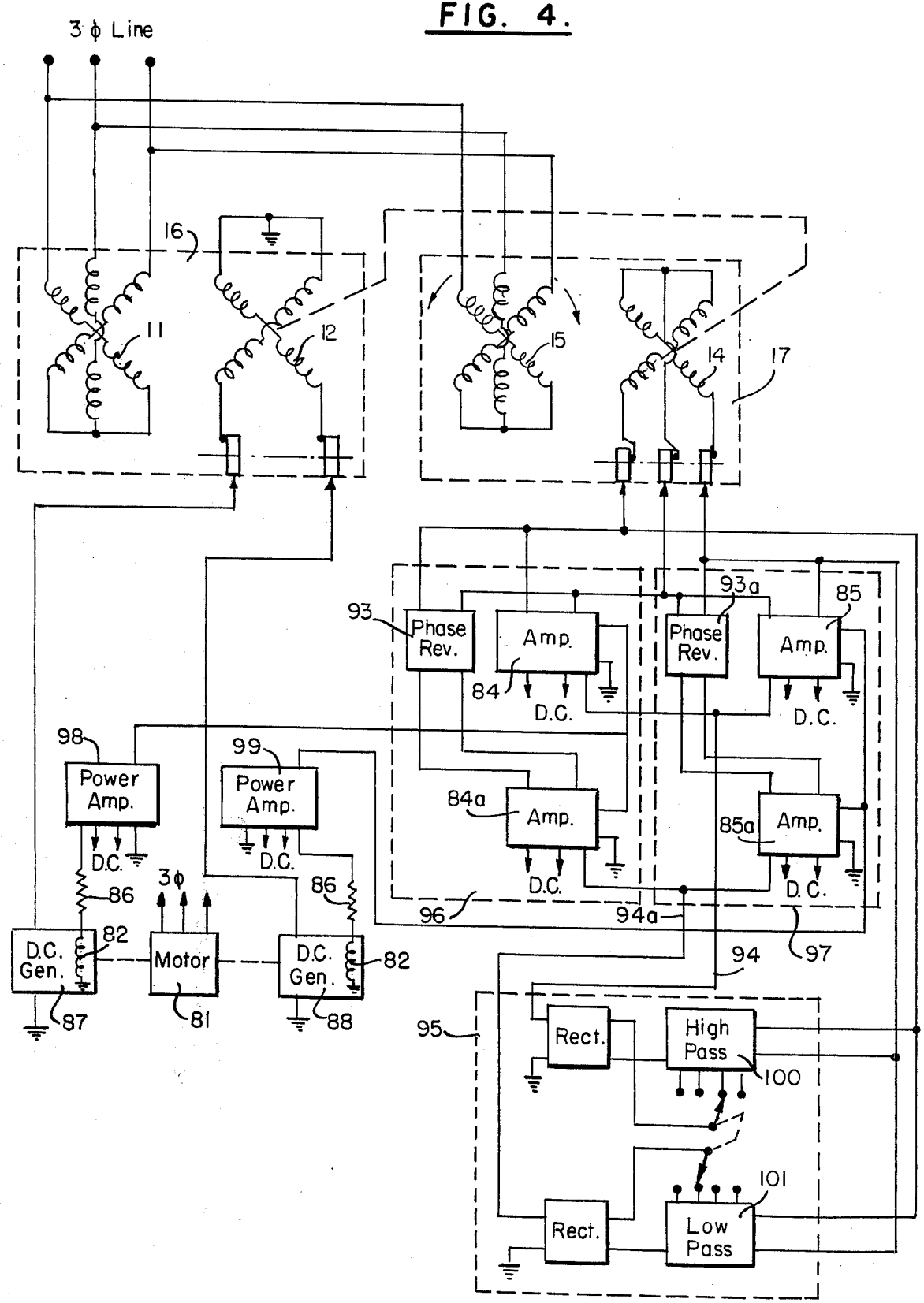
FIG. 4 is a modified form of the FIG. 3 system using direct current generators as amplifiers.

The power amplifiers 75 used in the motor system of FIG. 3 must be of the type that present an open circuit at the output terminals when biased to deliver zero output. This is necessitated by the fact that low resistance across the motor rotor will make it run as a short circuited rotor induction motor. The best known of the amplifiers answering the above requirement are those using transistors. While transistors make excellent amplifiers, their price in large power units is high. For these high power applications, therefore, the amplifying system shown in FIG. 4 is more practical, although the control circuit connected with it is more complicated. The FIG. 4 modified system is not very expensive, however, since the power level in these control circuits is in the milliwatt range.

In the arrangement of FIG. 4, the power amplifiers consist of two DC generators 87, 88 driven at constant speed by motor 81, and the field coils 82 of these generators receive their excitation current from transistor type amplifiers 98 and 99. As the excitation varies, the output of the generators 87, 88 also vary for well known reasons. Any alternating current (of low frequency) applied to the generator fields will result in alternating current from the output of these DC generators. The only precaution to be made is to use suitable resistors 86 in series with the generator field coils in order to reduce phase shift due to the inductance of the field coils. Negative feedback in amplifiers 98 and 99 will also help to eliminate the phase shift.

DC motor generator sets 81, 87, 88 of the type shown in FIG. 4 can easily be made in larger sizes, but their disadvantage is that, when they are not receiving excitation and not putting out any energy, they act as a low impedance. In order to eliminate the tendency of motor 16 to act as a shorted rotor induction motor under these conditions, it is necessary to reverse the phase of the voltage fed back to rotor 12, i.e., if the motor is running faster than the speed as determined by the cut off frequency of high pass filter 100. Reversed phase opposes the voltage generated in rotor 12 by the rotating field of stator 11.

To accomplish this phase reversal, two low power amplifiers 84, 84a and 85, 85a are used for each phase. The outputs of the two amplifiers 84 and 84a are connected parallel. This is also the case with amplifiers 85 and 85a. One of these amplifiers (for each phase) is fed by the voltage in reversed phase. This is accomplished by phase reversers 93 and 93a. Only one of the amplifiers (84 or 84a, and 85 or 85a) in each phase is allowed to operate at any one time, this being determined by the gain control arrangement 95. Control 95 consists of high and low pass filters 100, 101 which are so operated that, as soon as the high pass filter 100 cuts off due to lowered frequency, the low pass filter 101 begins to operate.

When the motor 16 runs slowly, the high pass filter 100 applies operating bias to amplifiers 84 and 85. As the motor speeds up, the output of high pass filter 100 is reduced, with a resulting reduction in the gain control signal on its associated line 94. This stops amplifiers 84 and 85 from operating. If the motor speed increases further, the output from generator rotor 17 is lowered in frequency and the low pass filter 101 passes operating signals via line 94a to the phase reversed amplifiers 84a and 85a. Since the outputs of amplifiers 84 and 84a in one phase are in parallel with each other, as are the outputs of amplifiers 85 and 85a in the other phase, the reverse phase amplifiers 84a, 85a will feed their outputs to power amplifiers 98 and 99 and from here to the field coils of DC generators 87 and 88.

The components in boxes 95, 96 and 97 can be made to operate at very low power and may be located on an etched circuit board. This requires the use of an additional power amplifier 98 and 99 for each phase to bring up the power to the desired level.

While I have thus described preferred embodiments of the present invention, many variations will be apparent to those skilled in the art. It must therefore be understood that the foregoing description is intended to be illustrative only and is not limitative of the present invention, and all such variations and modifications as are in accord with the principles described are meant to fall within the scope of the appended claims.

Having thus described my invention, I claim:

1. A motor system comprising a polyphase induction motor having a first wound stator and a first wound rotor mounted on a rotatable shaft for rotation adjacent said first stator, a polyphase generator having the same number of poles as said motor, said generator comprising a second wound stator and a second wound rotor mounted for rotation adjacent said second stator, the horsepower rating of said generator being less than that of said motor, means mechanically coupling said second rotor to said rotatable shaft to cause rotation of said first rotor to rotate said second rotor at the same rotational speed, a polyphase power source connected in parallel to both of said wound stators for energizing said stators in phase with one another with sinewave shaped voltages of like magnitude, a polyphase linear amplifier, rectifier power supply means disposed between said polyphase power source and said amplifier for energizing said amplifier with substantially D.C. power, said amplifier having its inputs connected to the windings of said second rotor, the outputs of said linear amplifier being connected to the windings of said first rotor whereby the polyphase sinewave shaped output voltages generated across the windings of said second rotor are amplified by said linear amplifier and supplied as amplified sinewave shaped voltages respectively to the windings of said first rotor to control the current flow in the windings of said first rotor.

2. The system of claim 1 wherein said first and second rotors are mounted on said shaft in axially spaced relation to one another, said first and second stators being disposed about said shaft adjacent their respective rotors, at least one of said stators being mounted for selective angular movement about said shaft thereby to permit the windings of said stators to be angularly displaced relative to one another to produce a phase difference between the voltages induced in said first rotor and the voltages supplied to said first rotor by said amplifier thereby to produce a starting torque between said first stator and first rotor.

3. The system of claim 2 including first and second pluralities of slip rings mounted on said shaft for rotation therewith, the windings of said first and second rotors being connected to said first and second pluralities of slip rings respectively, a plurality of brushes engaging said second plurality of slip rings for connecting the windings of said second rotor to the inputs of said linear amplifier, and a further plurality of brushes connecting the outputs of said linear amplifier to said first plurality of slip rings.

4. The system of claim 2 wherein said second stator is mounted for said selective angular movement about said shaft.

5. The system of claim 3 including means connected to said second stator for manually altering the angular position of said second stator relative to said first stator.

6. The system of claim 2 wherein the parameters of said generator and of said polyphase linear amplifier are so chosen that, when said stators are energized from said polyphase source and said rotors are stationary, the sinewave shaped voltages at the outputs of said linear amplifier are substantially equal and opposite to the sinewave shaped voltages induced in said first rotor by transformer action from said first stator thereby to prevent current flow in the windings of said first rotor until the windings of said stators are angularly displaced relative to one another.

7. A motor system comprising a polyphase induction motor having a wound stator and a wound rotor mounted for rotation adjacent said stator, a first polyphase power source connected to said stator windings for energizing said stator to produce a rotating magnetic field adjacent said rotor, a second polyphase power source comprising a dynamoelectric machine connected to said motor for rotation therewith and operative to supply sinewave shaped polyphase output voltages having the same phase as but a smaller amplitude than the sinewave shaped polyphase voltages which are induced in said motor rotor windings by said rotating magnetic field, a linear polyphase amplifier coupled to said machine for amplifying the polyphase output voltages of said dynamoelectric machine, means for connecting said amplifier polyphase voltages to the windings of said induction motor wound rotor respectively, and means for selectively producing a phase difference between the amplified sinewave shaped polyphase voltages which are connected from said amplifier to said rotor windings and the sinewave shaped polyphase voltages which are induced in said rotor windings by said rotating field to produce a torque between the rotor and stator of said motor.

8. The motor system of claim 7 wherein the amplitudes of said amplified polyphase voltages are substantially equal to the amplitudes of the polyphase voltages which are induced in said rotor windings by said rotating magnetic field.

9. The motor system of claim 7 wherein said machine comprises a further polyphase induction motor having a wound stator and a wound rotor each of which is smaller in size that the stator and rotor of said first-mentioned induction motor, the wound rotors of said two polyphase induction motors being mounted for rotation on a common rotatable shaft, said polyphase amplifier being connected between the wound rotors of said two motors, said means for selectively producing said phase difference comprising means for selectively changing the angular positions of the stator windings of said two motors relative to one another.

10. A variable speed motor system comprising a polyphase induction motor having a first wound stator and a first wound rotor mounted on a rotatable shaft for rotation adjacent said first stator, a polyphase generator having the same number of poles as said motor, said generator comprising a second wound stator and a second wound rotor mounted for rotation adjacent said second stator, the horsepower rating of said generator being less than that of said motor, means mechanically coupling said generator rotor to said rotatable shaft to cause rotation of said motor rotor to rotate said generator rotor at the same rotational speed, a polyphase power source connected in parallel to both of said wound stators for energizing said stators in phase with one another with sinewave-shaped voltages of like magnitude, polyphase linear amplifier means having its inputs connected to the windings of said generator rotor and its outputs connected to the windings of said motor rotor whereby the sinewave-shaped output voltages generated across the windings of said generator rotor are amplified by said amplifier means and supplied to the windings of said motor rotor to control the current flow in the windings of said motor rotor, frequency sensitive means coupled to the output of said generator rotor for monitoring the frequency of the voltages which are supplied to the inputs of said amplifier means, and means responsive to the output of said frequency sensitive means for controlling the magnitude of voltages at the output of said amplifier means thereby to regulate the rotational speed of said induction motor.

11. The motor system of claim 10 wherein said frequency sensitive means comprises high pass filter means.

12. The motor system of claim 10 wherein said frequency sensitive means comprises low pass filter means.

13. The motor system of claim 10 wherein said frequency sensitive means comprises a plurality of frequency filters having different frequency cutoff points respectively, and switch means for selectively rendering different ones of said filters operative to control the output of said amplifier means thereby to permit the rotational speed of said motor to be regulated relative to a selected one of a plurality of predetermined speeds.

14. The motor system of claim 10 including means for selectively rendering said frequency sensitive means inoperative to control the output of said amplifier means.

15. The motor system of claim 10 wherein said frequency sensitive means is operative to control a bias potential which is supplied to said amplifier means thereby to control the gain of said amplifier means.

16. The motor system of claim 15 including manually adjustable potentiometer means operative to vary said bias potential thereby to permit the rotational speed of said motor to be varied continuously over a preselected range.

17. The motor system of claim 10 wherein said amplifier means comprises a plural stage amplifier connected between each phase winding of said generator rotor and the corresponding phase winding of said motor rotor.

18. The motor system of claim 17 wherein said frequency sensitive means is operative to control the gain of each stage in each of said plural stage amplifiers.

19. The motor system of claim 17 wherein each of said plural stage amplifiers comprises a first stage having its input connected to said generator rotor and a second stage having its output connected to said motor rotor, said second stage comprising a rotating dynamoelectric machine operative to generate voltages which are supplied to said motor rotor, said dynamoelectric machine including a field winding, and means coupling the output of said first stage to said field winding to control the power output of said dynamoelectric machine.

20. The motor system of claim 19 wherein said dynamoelectric machine is rotated at substantially constant speed by a separate motor.

21. The motor system of claim 10 wherein said motor and generator rotors are each wound for two phase operation.

22. The motor system of claim 10 wherein said motor and generator rotors are each wound for three phase operation.

* * * * *